United States Patent [19]

Gilmer

[11] Patent Number: 6,136,396
[45] Date of Patent: Oct. 24, 2000

[54] POLYMERIC ARTICLES HAVING ANTISTATIC PROPERTIES AND METHODS FOR THEIR MANUFACTURE

[75] Inventor: Robin A. Gilmer, Marietta, Ga.

[73] Assignee: Tenneco Packaging Inc., Evanston, Ill.

[21] Appl. No.: 08/907,502

[22] Filed: Aug. 8, 1997

Related U.S. Application Data

[60] Provisional application No. 60/023,820, Aug. 12, 1996.

[51] Int. Cl.[7] .............................. A47G 19/23; C08J 9/224
[52] U.S. Cl. ..................... 428/36.5; 106/31.59; 206/499; 206/509; 264/DIG. 9; 428/319.3; 428/336; 428/516; 428/543; 521/57
[58] Field of Search .................................... 428/36.5, 519, 428/517, 319.3, 543, 516; 206/499, 505; 106/31.92, 31.59; 264/DIG. 9; 521/57

[56] References Cited

U.S. PATENT DOCUMENTS

| Re. 28,584 | 10/1975 | Marion | 53/296 |
|---|---|---|---|
| 3,272,418 | 9/1966 | Carter et al. | 229/1.5 |
| 3,312,383 | 4/1967 | Hammer et al. | 229/1.5 |
| 3,344,222 | 9/1967 | Shapiro et al. | 264/321 |

(List continued on next page.)

FOREIGN PATENT DOCUMENTS

| 8287150 | 3/1983 | Australia . |
|---|---|---|
| 8290138 | 5/1983 | Australia . |
| 8312405 | 9/1983 | Australia . |
| 8656241 | 11/1986 | Australia . |
| 9219076 | 1/1993 | Australia . |
| 8500221 | 11/1991 | Austria . |
| 896131 | 7/1983 | Belgium . |
| 7901535 | 10/1979 | Brazil . |
| 7901536 | 10/1979 | Brazil . |

(List continued on next page.)

OTHER PUBLICATIONS

Progress in Dielectrics, vol. 7, J.B. Birks; pp. 69–115.
Journal of Applied Physics, vol. 49, No. 2, Feb. 1978, pp. 798–800.
Journal of the Optical Society of America A Optics and Image Science, vol. 10, No. 7, Jul. 1993, pp. 1544–1548 (Abstract only).
IEE Transactions on Magnetics, vol. 29, No. 6, Nov. 1993, pp. 4170–4176 (Abstract only).
Static Dust Collection On Plastics, May, P.C. Woodland and E.E. Ziegler, pp. 95–178.
Packaging Material Standards for ESD Sensitive Items, Copyright 1988, pp.–1–44.

(List continued on next page.)

Primary Examiner—Nasser Ahmad
Assistant Examiner—Sandra M. Nolan
Attorney, Agent, or Firm—Jenkens & Gilchrist

[57] ABSTRACT

An article comprised of a polymeric material bearing a coating. The coating comprises a residual layer formed by applying and allowing to dry a mixture containing from about 7.5 to about 23.5 weight percent of a humidity sensitive antistatic surfactant compound and from about 10 to about 30 weight percent of a water soluble ink. The article possesses an electrostatic potential of from about −5 to about +5 kilovolts as measured at one inch from the coating. A process for producing a formed article which is relatively free from the effects of static electricity. The process includes the steps of topically applying a mixture comprising a humidity sensitive antistatic surfactant compound to a stock comprising a foamed polymeric material, conditioning the foam stock in a humidity-controlled environment effective to reduce electrostatic potential of the stock to between from about −5 to about +5 kilovolts, and thereafter forming the article from the conditioned foam stock. The polymeric material may comprise polystyrene and the water soluble ink may comprise a mixing white ink. The humidity sensitive surfactant is preferably comprised of a mixture of sodium alkyl sulfonates consisting essentially of sulfonates having the molecular formulas $C_{10-18}H_{21-39}SO_3Na$.

21 Claims, 6 Drawing Sheets

U.S. PATENT DOCUMENTS

| | | | |
|---|---|---|---|
| 3,439,590 | 4/1969 | Mayr | 493/107 |
| 3,464,260 | 9/1969 | Heyman | 73/806 |
| 3,482,012 | 12/1969 | Baklor | 264/296 |
| 3,521,788 | 7/1970 | Bank et al. | 220/675 |
| 3,595,464 | 7/1971 | Harrison | 229/1.5 |
| 3,703,066 | 11/1972 | Marion | 53/296 |
| 3,726,125 | 4/1973 | Heyman | 374/55 |
| 3,788,463 | 1/1974 | Ruff | 206/432 |
| 3,874,830 | 4/1975 | Carter et al. | 425/4 |
| 3,945,528 | 3/1976 | Mowrey | 220/265 |
| 4,016,030 | 4/1977 | Sobota | 162/199 |
| 4,044,484 | 8/1977 | Ludder | 40/306 |
| 4,056,210 | 11/1977 | Boyle | 220/712 |
| 4,060,577 | 11/1977 | Collins | 264/45.4 |
| 4,076,123 | 2/1978 | Davis | 206/503 |
| 4,098,403 | 7/1978 | Davis | 206/519 |
| 4,101,050 | 7/1978 | Buckler et al. | 229/3.5 |
| 4,106,660 | 8/1978 | Boyle | 220/712 |
| 4,121,402 | 10/1978 | Busse et al. | 53/452 |
| 4,127,189 | 11/1978 | Shumrak et al. | 206/520 |
| 4,154,345 | 5/1979 | Davis et al. | 206/527 |
| 4,171,085 | 10/1979 | Doty | 229/1.5 |
| 4,250,129 | 2/1981 | Winstead | 264/37 |
| 4,261,504 | 4/1981 | Cowan | 229/123.1 |
| 4,268,335 | 5/1981 | Herbst | 156/218 |
| 4,275,815 | 6/1981 | Davis | 206/508 |
| 4,284,226 | 8/1981 | Herbst | 229/1.5 |
| 4,288,400 | 9/1981 | Winstead | 264/210.1 |
| 4,299,349 | 11/1981 | Gilden | 229/3.5 |
| 4,306,849 | 12/1981 | Busse et al. | 425/305.1 |
| 4,307,049 | 12/1981 | Winstead | 264/37 |
| 4,349,400 | 9/1982 | Gilden | 156/217 |
| 4,349,571 | 9/1982 | Weinstein et al. | 426/124 |
| 4,365,460 | 12/1982 | Busse et al. | 156/217 |
| 4,384,836 | 5/1983 | Winstead | 425/145 |
| 4,387,551 | 6/1983 | Cowan | 53/478 |
| 4,409,045 | 10/1983 | Busse | 156/69 |
| 4,413,964 | 11/1983 | Winstead | 425/66 |
| 4,416,607 | 11/1983 | Winstead | 425/325 |
| 4,420,291 | 12/1983 | Winstead | 417/338 |
| 4,420,300 | 12/1983 | Winstead | 425/142 |
| 4,421,712 | 12/1983 | Winstead | 264/551 |
| 4,436,679 | 3/1984 | Winstead | 264/40.3 |
| 4,438,058 | 3/1984 | Tanaka | 264/51 |
| 4,443,679 | 4/1984 | Balordi | 264/40.3 |
| 4,453,998 | 6/1984 | Busse et al. | 156/350 |
| 4,472,440 | 9/1984 | Bank | 426/128 |
| 4,478,121 | 10/1984 | Balordi | 83/209 |
| 4,487,329 | 12/1984 | Winstead | 220/276 |
| 4,509,660 | 4/1985 | Makilaakso | 222/107 |
| 4,518,096 | 5/1985 | Winstead | 220/268 |
| 4,559,765 | 12/1985 | Busse et al. | 53/557 |
| 4,718,555 | 1/1988 | Amberg | 206/519 |
| 4,747,510 | 5/1988 | Mack | 220/270 |
| 4,808,448 | 2/1989 | Cox | 428/36.5 |
| 4,935,091 | 6/1990 | Busse et al. | 156/443 |
| 5,110,669 | 5/1992 | Knobel et al. | 428/215 |

FOREIGN PATENT DOCUMENTS

| | | |
|---|---|---|
| 7908585 | 9/1980 | Brazil . |
| 8103629 | 1/1983 | Brazil . |
| 8204956 | 8/1983 | Brazil . |
| 8206396 | 9/1983 | Brazil . |
| 8301325 | 11/1983 | Brazil . |
| 1123567 | 5/1982 | Canada . |
| 1127364 | 7/1982 | Canada . |
| 1133221 | 10/1982 | Canada . |
| 1135021 | 11/1982 | Canada . |
| 1146324 | 5/1983 | Canada . |
| 1152278 | 8/1983 | Canada . |
| 1152884 | 8/1983 | Canada . |
| 1189266 | 6/1985 | Canada . |
| 1200663 | 2/1986 | Canada . |
| 1256063 | 6/1989 | Canada . |
| 1275269 | 10/1990 | Canada . |
| 1288728 | 9/1991 | Canada . |
| 7403781 | 3/1975 | Denmark . |
| 8301220 | 11/1983 | Denmark . |
| 8500477 | 8/1985 | Denmark . |
| 4092 | 9/1979 | European Pat. Off. . |
| 4971 | 10/1979 | European Pat. Off. . |
| 45095 | 2/1982 | European Pat. Off. . |
| 55844 | 7/1982 | European Pat. Off. . |
| 56661 | 7/1982 | European Pat. Off. . |
| 67238 | 12/1982 | European Pat. Off. . |
| 13406 | 3/1983 | European Pat. Off. . |
| 73416 | 3/1983 | European Pat. Off. . |
| 79012 | 5/1983 | European Pat. Off. . |
| 127968 | 12/1984 | European Pat. Off. . |
| 138592 | 4/1985 | European Pat. Off. . |
| 217864 | 4/1987 | European Pat. Off. . |
| 587661 | 3/1994 | European Pat. Off. . |
| 7302230 | 2/1975 | Finland . |
| 7502879 | 5/1977 | Finland . |
| 8000637 | 10/1981 | Finland . |
| 2236733 | 3/1975 | France . |
| 2523926 | 9/1983 | France . |
| 2560154 | 8/1985 | France . |
| 2433457 | 2/1975 | Germany . |
| 2646735 | 4/1977 | Germany . |
| 2964687 | 3/1983 | Germany . |
| 2965121 | 5/1983 | Germany . |
| 3309678 | 9/1983 | Germany . |
| 2966247 | 11/1983 | Germany . |
| 3400266 | 8/1984 | Germany . |
| 3418849 | 8/1985 | Germany . |
| 3418829 | 11/1985 | Germany . |
| 3690205 | 8/1987 | Germany . |
| 3629655 | 3/1988 | Germany . |
| 3474804 | 12/1988 | Germany . |
| 3477657 | 5/1989 | Germany . |
| 4118624 | 4/1992 | Germany . |
| 3418849 | 8/1992 | Germany . |
| 54-127479 | 10/1979 | Japan . |
| 54-132673 | 10/1979 | Japan . |
| 54-141851 | 11/1979 | Japan . |
| 57-133033 | 8/1982 | Japan . |
| 57-203513 | 12/1982 | Japan . |
| 58-090932 | 5/1983 | Japan . |
| 58-126127 | 7/1983 | Japan . |
| 63-500164 | 1/1988 | Japan . |
| 88015141 | 4/1988 | Japan . |
| 7409026 | 1/1975 | Netherlands . |
| 8300866 | 10/1983 | Netherlands . |
| 8500353 | 9/1985 | Netherlands . |
| 243064 | 5/1994 | New Zealand . |
| 244379 | 12/1994 | New Zealand . |
| 7402449 | 2/1975 | Norway . |
| 8300938 | 10/1983 | Norway . |
| 76382 | 3/1984 | Portugal . |
| 7409192 | 2/1975 | Sweden . |
| 7512722 | 5/1977 | Sweden . |
| 8301446 | 10/1983 | Sweden . |
| 8500685 | 8/1985 | Sweden . |
| 8600645 | 5/1987 | Sweden . |
| 460516 | 10/1989 | Sweden . |
| 667058 | 9/1988 | Switzerland . |
| 1032961 | 6/1966 | United Kingdom ............. C09D 3/16 |
| 1482591 | 8/1977 | United Kingdom . |
| 2070504 | 9/1981 | United Kingdom . |
| 2118517 | 11/1983 | United Kingdom . |
| 2134481 | 8/1984 | United Kingdom . |

| | | |
|---|---|---|
| 2154854 | 9/1985 | United Kingdom . |
| 2157153 | 10/1985 | United Kingdom . |
| 2187083 | 9/1987 | United Kingdom . |
| 2187083 | 10/1989 | United Kingdom . |
| WO 8606045 | 10/1986 | WIPO . |
| WO 9221505 | 12/1992 | WIPO . |

OTHER PUBLICATIONS

The Generation and Dissipation of Static Charge On Dielectrics in a Vacuum, D.K. Davies, pp. 29–36 (Abstract only).
Atmospheric Electrostatics, Bernard Vonnegut, pp. 390–421.
Effect Of Electrostatic Forces On Conduction At An Acetate–Metal Interface, K.L. Clum, 195–206 (Abstract only).
Antistatika Antistatic Agents Product Leaflet, 1992, pp. 20 (Abstract only).
Additives for High Concentration Masterbatch Systems, 1993, paper 5, pp. 12. 813 (Abstract only).
Antistats, 1990, No. 20, p. 121–1 (Abstract only).
Additives Aid Processing Of Expanded Polystyrene, 1989, No. 7, p. 5 (Abstract only).
Oleo Chemicals As Plastics Additives, P.D. Kamat, J.R. Shah, 1989, 34, No. 7 (Abstract only).
US Demand To Rise For Plastics Additives, 1989 52, No. 1376, p. 7 (Abstract only).
Antifog Antistat Eases Processing Problems, J.P. Trotoir 1988, No. 11, p. 86–92 (Abstract only).
Mineral Reinforcements: Now They Help To Ease Additive Tightness, G.R. Smoluk, 1988, 65 No. 7, p. 46–8 (Abstract only).
Plastic Additives Handbook; Stabilizers, Processing Aids, Plasticizers, Fillers, Reinforcements, Colorants for Thermoplastics, 2 edn., R. Gachter, H. Muller, 1987, p. 754 (Abstract only).
Eliminating HDPE Static, 1986, 13, No. 11, p. 87 (Abstract only).
Surfactants for Expandable Polystyrene, 1985, p. 4 (Abstract only).
Food Laws Shaping Anti–Static Growth, 1985, No. 1084, p. 7 (Abstract only).
Styrenes Without Static, 1985, p. 48 (Abstract only).
Technical Aspects of Italian Regulations Concerning Materials Coming In Contact With Foodstuffs Compared with the EEC Directives in Preparation, L. Gramiccioni, R. Binetti, A. Sampaolo, 1982, p. 34–42 (Abstract only).
ICS Surfactants, Everberg Belgium Has Extended its Range, No. 1546 1994, pp. 6 (Abstract only).
Plastics: Chemicals and Additives: Antistats., vol. 22 No. 9, pp. 71–72 (Abstract only).
Food Container, Y. Fukui, K. Kuroda, European Patent Application EP 0 407 198 A1, 1991 (Abstract only).
Migration of Monomers and Additives from Food Packaging Materials to Food, S.B. Thomsen, D. Stena, 1985 (Abstract only).
Antistatic and/or Antifogging Agents in Food–Packaging Materials., 1980 (Abstract only).
Adjournment of the Ministerial Decree of Mar. 21, 1973 Concerning the Control of Packaging Materials, Containers, Utensils Brought In Contact With Food and Items for Personal Use, 1979 (Abstract only).
Antistatic Finishes for Plastics From the Food Hygiene and Toxicological Viewpoints, H. Woggon, W.J. Woggon, 1977 (Abstract only).

Antistatic Finishing Of Food Packs, K. Polzhoter, H.D. Lehman, 1974 (Abstract only).
Plastics In the Food Industry Toxicological Aspect, R. Lefaux, No. 131, 1973 (Abstract only).
Food Additives Antistatic and Antifogging Agents in Food packaging material, 1972 (Abstract only).
Some Aspects of the Toxicology of Food, S.D. Gangolli, 1972.
Free–Flowing, Non–Dusting Antistatic Agent Composition pellets and Method of Forming Same, Stewart Gloyer (Abstract only).
Tallow Use in Plastic Food Packaging Hit By Rabbis, 1994 (Abstract only).
Thermoplastic Additives From Akzo, Akzo Chemical, pp 14, 1993.
Water–Based Coating Composition and Polymer film Coated Therewith (Abstract only).
Marked Increase in Plastics Packaging With External Antistatic Coating, U. Mack, vol. 37 No. 9, 80 4 pp, 1984 (Abstract only).
Ultra High Melt Flow Polyproplene For Melt Blown Applications Available From Ferro, 1990.
New Anti–Statics Stop Static, 1986 (Abstract only).
Specialties NewsFront: PPG Launches Antistat Products, pp. 22, 1991 (Abstract only).
Antistatic Slip and Anti–Blocking Agents for Plastics, pp. 4, 1989 (Abstract only).
Rapid Analysis of Polymer Homologues and Additives With SFE/SFC–MS Coupling, T. Bucherl, A Gruner, N. Palibroda, 1994 (Abstract only).
Preliminary Study of Specific Migration of Polymer Additives From Polypropylene To an Acid–Based Food Stimulant., B.E. Berg, D.R. Hegna, N. Orlien, T. Griebrokk, 1992 (Abstract only).
Production of Biosurfactants by Microorganism, D. Kitamoto, 1992 (Abstract only).
Investigation of Low Mass Oligomers and Polymer Additives From Plastics, D. Dilettato, P.J. Arpino; K. Nguyen, A. Bruchet, 1991 (Abstract only).
Migration of Monomers and Additives From Food Packaging Materials to Foods, S.B. Thomsen, D. Stena, 1985 (Abstract only).
Antistatic and/or Antifogging Agents in Food–Packaging Materials, 1980 (Abstract only).
Multiplies, the Belgian Example, 1979 (Abstract only).
Automatic Washer Restores Luster to Plastic Trays, C. Kimbrough, K. Robe, 1973 (Abstract only).
Plastics in the Food Industry, Toxicological Aspect, R. Lefaux, 1973.
Electrostatic Hazards—A Review of Modern Trends, N. Gibson, pp. 1–26 (Abstract only).
Chemical Abstracts Search on Maxwell–Wagner Effect On Polystyrene or Other Polymers Business Information Center, 1996 (Abstract only).
Military Specification Barrier Materials, Flexible, Electrostatic Protective, Heat Sealable, pp. 1–31, 1989.
Analysis of Human Body Model for Electrostatic Discharge (ESD) With Multiple Charged Sources, William Greason, vol. Part 3, pp. 1843–1848, 1993 (Abstract only).
A Universal Finite–Element Analysis of the Bipolar Ionized Field, M.–Abdel. Salam and Z. Al–Hamouz, vol. Part 3, pp. 1799–1804, 1993 (Abstract only).
Electrostatic Measurements on Plastic Webs, William Durkin, pp. 1728–1736, 1993 (Abstract only).

Corona Discharge Treatment, P.B. Sherman, pp. 1669–1685, 1993 (Abstract only).

Permittivity of Conductor–Dielectric Heterogeneous Mixtures, K. Lal and R. Parshad, pp. 1788–1792, 1973 (Abstract only).

Dielectric and Thermoanalytical Behavior of Poly(p–phenylene sulfide) Polymers, Sachio Yasufuku, vol. 28 No. 3, pp. 330–335, 1993 (Abstract only).

Maxwell–Wagner–Sillars Relaxations in Polystyrene––Glass–Bead Composites, G. Perrier, A. Bergeret, pp. 2651–2657, 1994.

Electrical Properties of Poly–trans–2,5–Dimethylpiperazine–Fumaramide. Conduction and Relaxation Process, Franco Sandrolini, Antonio Motori and Andrea Saccani, pp. 1615–1621 (Abstract only).

De–Electrization of Plastic Products By Increasing Surface Conductivity, Jachym Bronislaw, Irene Witort, Gerard Wisniewski, pp. 111–116.

Prevention and Control of Static Electricity in Polystyrene Food Containers Business Information, 1995 (Abstract only).

Intermittent Contact Electrification of Polymers: Simulated and Experimental Results of Polystyrene, J. Fuhrmann and H.J. Streibel, pp. 145–149 (Abstract only).

High–Energy Discharges From Plastic Surfaces, P. Tolson (Abstract only).

The Clausius–Mossotti Problem for Cubic Arrays of Spheres, William Doyle, pp. 795–797 (Abstract only).

Model The Dielectric Frequency Response Of Foamed Polymers, pp. 135–139 (Abstract only).

Antistatic Agents, pp. 149–183 (Abstract only).

Antistatic Agent, Dr. H.W. Finck, pp. 565–583 (Abstract only).

All–Spec Static Control Inc. (Abstract only).

Hoechst Celanese Corp., Specialty Chemicals Div. (Abstract only).

Antistatic Industries (Abstract only).

Dycem (Abstract only).

Yankee Engineering, Inc. (Abstract only).

Degage Corp. (Abstract only).

Defense Research Establishment (Abstract only).

Antistatic and Dust Repellent Coating, 1993 (Abstract only).

Floor Coatings (Latest citations from World Surface Coating Abstracts) (Abstract only).

Carpet Backing Materials, NERAC, Inc. (abstract only).

Antistatic Treatments for Textile Materials NERAC, Inc., 1994 (Abstract only).

Electrostatic Discharge (ESD)(Prevision and Control in Integrated Circuits (Latest citations from INSPEC—The Database for physics, electronics, and computing) Published Search 1993 (Abstract only).

Polystyrene; Polystyrene Film; New Product development, Dr. Eugene R. Moore, 1986–1994 (Abstract only).

Acrylic Polymerization, Dr. H.J. Harwood, 1986–1994 (Abstract only).

Polyurethanes and Other Isocyanate–Based Polymers; High Temperature Resistant Isocyanate–Based Polymers, Dr. Kurt Frisch, 1986–1994 (Abstract only).

Plastisol; Organisol, Dr. Don S. Wozniak, 1986–1994 (Abstract only).

Prevention of Electrostatic Hazards Associated with Shipboard Inert Gas Operation, J.S. Mills and E.J. Haighton, 1983.

The Ignition of Natural Gas by Spark Discharges from the Body, N. Wilson, 1983.

Electrostatic Measurements on Plastic Webs, William J. Durkin, pp. 1728–1736.

POLYMERIC ARTICLES HAVING ANTISTATIC PROPERTIES AND METHODS FOR THEIR MANUFACTURE

CROSS REFERENCE TO RELATED APPLICATIONS

This application claims the benefit of U.S. Provisional Application No. 60/023,820, filed Aug. 12, 1996.

FIELD OF THE INVENTION

This invention relates to articles having improved antistatic properties, that are formed at least in part from polymeric materials, as well as to methods and compositions useful for producing those articles.

BACKGROUND OF THE INVENTION

The use of articles formed at least in part from a polymeric material is widespread. Foamed polymer materials in particular are used in a wide variety of applications because foamed polymer products possess desirable insulating, shock absorbing or strength to weight ratio properties. For example, the food service industry often uses foamed polystyrene containers thermoformed from a foamed polymer roll stock because these containers are strong, lightweight and possess good thermal insulating properties.

Unfortunately, the presence of static electricity on polymeric articles can limit the usefulness of the containers. Undesired static electricity can hinder separation of individual articles from a stack of nested articles and can cause the articles to collect dust or other fine particles present in the environment where the articles are manufactured or used.

Foamed polymer cups typify the foregoing problems. These cups usually are supplied to a food service vendor as a stack of several nested cups wrapped in a plastic sleeve. Static cling may only be a nuisance when foam cups are manually separated from a nested cup stack. However, when cup stacks are used in automated beverage vending machine applications, static charges can prevent reliable separating and dispensing of individual cups and cause the cups to collect dust prior to dispensing. While these effects are more pronounced with foam cups, the effects may occur when solid plastic cups are used, and to a lesser extent when paper cups are coated with one or more layers of solid polymeric materials.

Reliable cup separation is a critical prerequisite in vending applications. Automated vending machines typically employ vertical stacks of nested cups stored in a multi-position turret. When a drink is vended, a dispensing ring located at the bottom of a cup stack disengages the lowest cup from the stack. The disengaged cup traverses a chute or similar path by gravity to a cup fill area of the vending machine. Because gravity is the primary force causing the disengaged cup to travel to the cup fill area, and because a cup is a relatively light object, disengagement and travel of the cup can be substantially affected by electrostatic forces. These electrostatic forces can prevent the timely arrival of the cup in the cup fill area. If the cup is late to the cup fill area, incomplete cup fills can result. Even worse, electrostatic forces may prevent the cup from reaching the cup fill area, resulting in a customer watching his or her drink dispensing directly into the cup fill area drain. In addition to customer dissatisfaction, late or non-arrival of cups at the filling station often results in a demand for an unnecessary and expensive service call.

As a result of above discussed problems, vending service companies typically require that cup vending failures not exceed a failure rate of 1 in 1000 vending attempts, with some companies requiring that failure rates not exceed 1 in 100,000 vending attempts. These very demanding specifications have resulted in cup producers employing various mechanical and chemical methods in order to produce a reliably vended foam cup.

Mechanical efforts to improve the vendibility of foam cup attempt to minimize the contact area between adjacent nested cups, thereby reducing the chance that cups will fail to drop in a timely manner. For example, the Sweetheart Cup Company produces a TROPHY brand cup which includes a plurality of indentations in the lower cup sidewall. The indentations prevent the cups from nesting completely within each other, which minimizes contact of adjacent cup surfaces. While this mechanical method reduces friction between adjacent cups, some sidewall to sidewall contact between cups remains. Because static cling problems can occur when any part of a cup contacts any part of an adjacent cup, minimizing the area of sidewall contact does not eliminate electrostatic attraction between adjacent cups. Furthermore, cups with sidewall indentations increases the vertical stack height for a given number of cups which reduces the cup capacity of a given vending machine.

Electrostatic problems may also be reduced by applying chemical antistatic materials to foamed products. In food container applications, these antistatic agents typically take the form of organic compounds extruded or otherwise contained in either a typically hydrophobic polymeric foamed material layer or contained in solid material adhered to a polymeric foam material layer. In a typical foam cup application, an antistatic agent is combined with a resin used to fabricate a cup's foamed or solid polymeric material and subsequently migrates or "blooms" to the surface of the cup slowly during the perceived useful life of the cup. After blooming to the cup's surface, the antistatic agent interacts with atmospheric moisture to form a conductive surface which can dissipate static charges. In many instances, the use of such extruded antistatic compounds alone is insufficient to produce a reliably vended cup. The use of anti static agents as just described may be inadequate for any of several reasons. For example, because the antistatic agent "blooms" to the surface slowly or at an unpredictable rate, a discontinuous hydrophilic film may be formed that cannot uniformly dissipate a static charge from the object's surface. Alternatively, the foregoing method may fail either because the successful use of these compounds requires the presence of relatively high levels of ambient moisture which frequently are not present in air conditioned environments or under dry winter weather conditions, or because extruded antistatic materials remain predominantly within the polymeric material and therefore are not highly available at the surface of the polymeric material to minimize static accumulation during the cup production process. In addition, the choice of such anti static agents is limited in food container applications because of governmental regulations.

Although the antistatic agents discussed above may be applied directly to a surface of a cup, this process results in an uncontrolled loss of antistatic agent from the cup and interferes with the ability of the cup to durably retain a printed image during manufacturing or use. This later consideration is of substantial commercial importance because the sponsors of graphic information printed on a vending cup do not want their information to be displayed in a low quality manner or have the scuffed or smudged ink from the vending cup soil a user clothes or other objects.

Other types of non-blooming chemical antistatic compounds and methods to produce such products, such as those disclosed in U.S. Pat. No. 4,715,968, claim to function independently of ambient moisture conditions, and might be useful in products destined for automated vending applications, but these non-blooming compounds are not believed to meet governmental requirements for foodstuff-related applications.

Therefore, a need exists for polymeric products, including foamed polymeric products, that are relatively free from the effects of static electricity. The products should preferably retain their antistatic properties for extended periods of time, have no objectionable odors or taste as perceived by a consumer, and retain a well-defined printed image if a printed image is desirable.

SUMMARY OF THE INVENTION

A first embodiment of the invention provides a formed article which is relatively free from the effects of static electricity. The article is formed from materials including a polymeric material, and the polymeric material bears an antistatic coating over at least part of its surface. The coating is a residual layer formed by applying and allowing to dry a mixture comprising from about 7.5 to about 23.5 weight percent of a humidity sensitive antistatic surfactant compound and from about 10 to about 30 weight percent of a water soluble ink. The article possesses an electrostatic potential of from about −5 to about +5 kilovolts as measured at one inch from the coating. The low electrostatic potential of the article provides the article with good antistatic properties. The articles preferably are manufactured from a polymeric foam stock.

The term "electrostatic potential" as used herein refers to the highest electrostatic potential measured on any surface of an article at a distance of one inch from the surface using an electrostatic field strength meter.

The term "foam stock" as used herein refers to any sheet or roll stock material having at least one foamed polymeric layer and from which an article is subsequently formed. For example, foam stock includes sheets of a single foamed polymer such as polystyrene or mixtures of polystyrene and one or more other polymers, and laminated stocks incorporating a foamed polymer layer and a non-foam layer such as an extruded solid polymer or other material like paper or cardboard.

The term "humidity sensitive antistatic surfactant compound" as used herein refers to any highly polar compound that adheres to a polymeric surface of a foamed polymer stock and which demonstrates an increased propensity for dissipating a static charge as ambient humidity is increased. The term includes by example cationic antistatic compounds such as quaternary ammonium salts of organic compounds having alkyl chains of from about 4 to about 20 carbon atoms in length; anionic antistatic compounds such as alkyl sulfates, alkyl sulfonates and alkyl phosphates having alkyl chains of from about 4 to about 20 carbon atoms in length; and nonionic highly polar organic compounds such as polyvinyl alcohol, polyvinylpyrrolidone and polyethers, as well as amines, acids and fatty acid esters having alkyl groups of from about 4 to about 20 carbon atoms in length.

In another embodiment of the invention, a process produces a formed article which is relatively free from the effects of static electricity. The process includes the steps of topically applying a mixture comprising a humidity sensitive antistatic surfactant compound to a stock comprising a foamed polymeric material, conditioning the foam stock in a humidity-controlled environment effective to reduce electrostatic potential of the stock to between from about −5 to about +5 kilovolts, and thereafter forming the article from the conditioned foam stock.

In yet another embodiment of the invention, a process produces a nested stack of at least 10 articles having good antistatic properties from a polymeric foam stack. This process includes the steps of topically applying a mixture comprising from about 7.5 to about 23.5 weight percent of an ionic humidity-sensitive antistatic surfactant and about 10 to about 30 weight percent of a water-soluble ink to the foam stock, thereafter forming at least 10 of the articles from the foam stock, and nestably stacking the formed articles. The resulting nested stack of articles exhibits a measured electrostatic potential from about −5 to about +5 kilovolts.

The term "ionic, humidity-sensitive antistatic surfactant compound" as used herein refers to any highly polar ionic compound that adheres to a polymeric surface of a foamed stock and which demonstrates an increased propensity for dissipating a static charge as ambient humidity is increased. The term includes by example cationic antistatic compounds such as quaternary ammonium salts of organic compounds having alkyl chains of from about 4 to about 20 carbon atoms in length and anionic antistatic compounds such as alkyl sulfates, sulfonates and phosphates having alkyl chains of from about 4 to about 20 carbon atoms in length, but not nonionic antistatic compounds such as polymeric or long alkanols, ethers, amines, acids or fatty acids.

The term "stack" as used herein refers to a plurality of substantially identically-shaped articles symmetrically placed one adjacent another, and includes both nestably stacked articles as defined below and stacks of non-nestable articles such as foam sheets. The term "nested stack" or "nestably stacked" as used herein refers to a plurality of substantially identically-shaped articles symmetrically arranged in such a manner that a portion of an article is contained within a portion of one or more adjacent articles, such as the stacks of foam cups or plates commonly available in grocery stores.

In another embodiment of the invention, a printed overcoat containing water, a water soluble transparent or translucent ink, and an ionic humidity sensitive antistatic surfactant compound is used effectively in the absence of the humidifying the material to produce foamed articles which, even when stacked or nested, are relatively free from the effects of static electricity and which can durably retain a printed image. This embodiment of the invention which does not require humidity conditioning of the roll stock is preferred wherever the ambient humidity conditions at the manufacturing location are sufficient to activate the antistatic properties of the topically applied overcoat. Articles produced by this process typically exhibit electrostatic potentials from about −5 to about +5 kilovolts when nestably stacked and, thus, are easily separated by gravimetric forces acting on the formed articles. These articles are ideally suited for food vending applications such as the dispensing of hot beverages into cups because the cups insulate well, reliably vend and present a high quality durable image useful for advertising or the display of other graphic information.

In still another embodiment of the invention, an antistatic solution for application to a polymeric surface is provided which includes from about 7.5 to about 23.5 weight percent of an ionic humidity-sensitive antistatic surfactant, from about 10 to about 30 weight percent of a water soluble ink, and from about 17.5 to about 46.5 weight percent of water.

Preferred embodiments of the foregoing inventions employ a printed overcoat containing water, a water soluble transparent or translucent ink, and an ionic humidity sensitive antistatic surfactant compound. In these embodiments, the ink acts as a binder which causes the antistatic agent to be more effectively bound to the surface of the produced article. Thus, the antistatic agent performance does not rapidly deteriorate as might be expected when an antistatic agent is topically applied to a surface because the binder prevents the topically applied anti-static agent from being volatilized or abraded during manufacture and from migrating into the foam after application. In addition, the use of the transparent ink as a binder in the antistatic overcoat protects the underlying graphic images from scuffing or smearing during subsequent manufacturing steps and use, problems known to occur when images are present on stock to which antistatic agents have been topically applied. Furthermore, the topical application of the antistatic agent results in a more continuous, more concentrated hydrophilic film of antistatic agent available during the manufacturing process on the article's surface than can be obtained by an extruded antistatic agent that slowly blooms to the article's surface.

Preferred embodiments of the foregoing inventions are formed from polystyrene foam/solid polystyrene laminate stocks and employ anionic humidity sensitive surfactants.

BRIEF DESCRIPTION OF THE DRAWINGS

Other objects and advantages of the invention will become apparent upon reading the following detailed description and upon reference to the drawings in which.

While the invention is susceptible to various modifications and alternative forms, a specific embodiment thereof has been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

According to one embodiment of the present invention, processes and articles are discussed below with respect to consistently manufacturing a reliable vending cup having a durable printed surface and durable antistatic properties. Furthermore, while the following description focuses on the production of foam vending cups from polystyrene, those skilled in the art will recognize that the invention is applicable in other areas. For example, the present invention is useful for producing a wide variety of articles from a stock including at least one layer of materials having a propensity for generating or collecting static electricity during the articles' production, storage, handling or use.

Process to Manufacture Foam Cups

Figure 1:
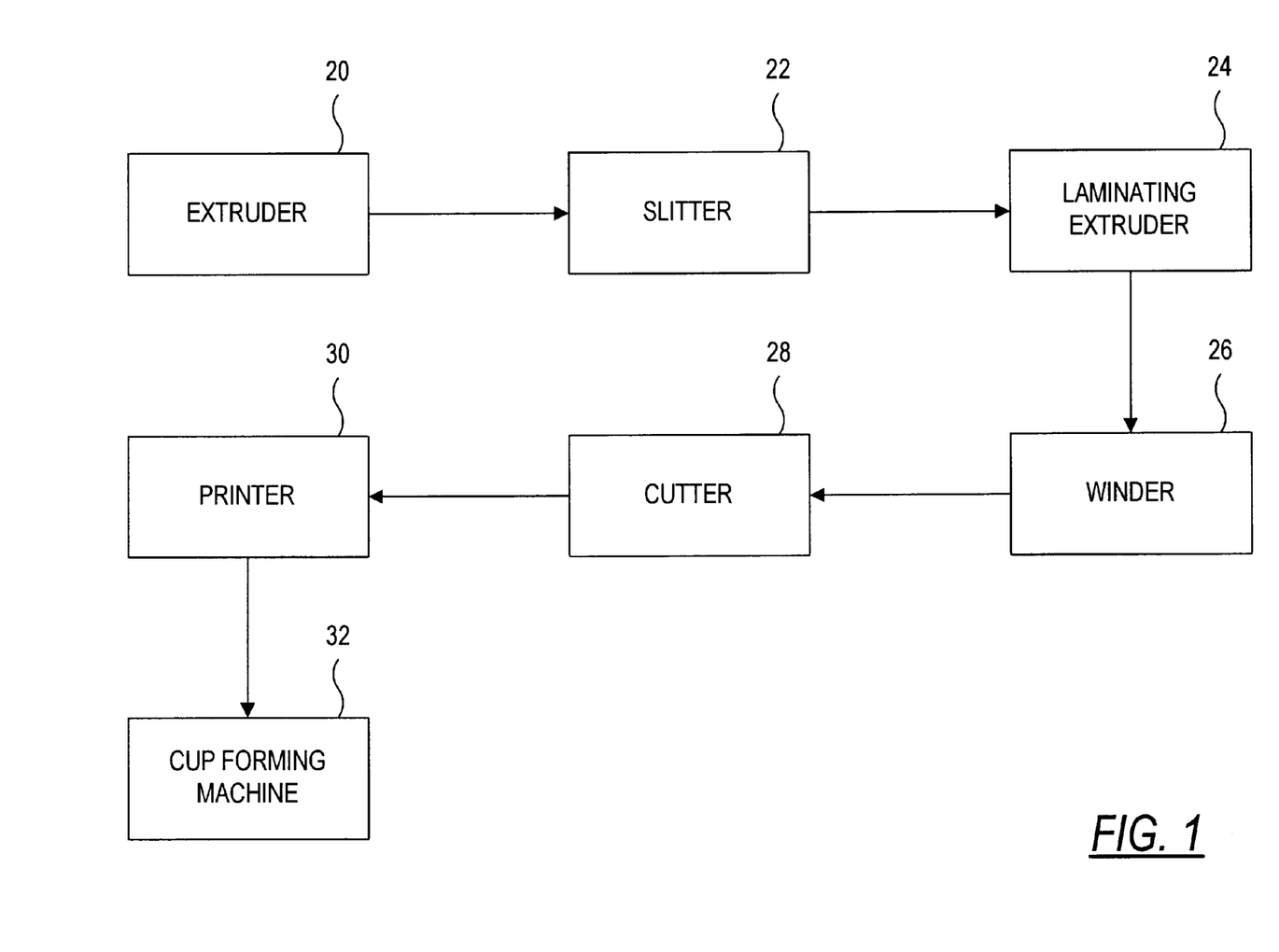
FIG. 1 is a flow chart of a typical process used to manufacture polystyrene foam cups.

Referring to FIG. 1, there is a schematic illustration of a process used to manufacture foam cups. This process may be modified as described later herein to produce foam cup stacks in accordance with the present invention which are relatively free of the effects of static electricity.

In the process of FIG. 1, an extruder 20 fitted with a annular die produces tubular polystyrene foam stock. The foam stock is slit in a slitter 22 to produce a polystyrene foam web about 52 inches wide and about 0.04 inches thick. The foam web runs from the slitter 22 into a laminating extruder 24 which coats the foam sheet stock with a layer of impact polystyrene to form a web of impact polystyrene and foam having a thickness of about 0.03 inches. A winder 26 rolls laminated sheet stock produced by the extruder 24, and then a cutter 28 cuts the wound rolls into rolls of sidewall stock and/or bottom stock of the required dimensions for use in a cup forming machine.

A coating or graphic art may be applied to cup sidewall stock by feeding cup roll stock through a printer 30 which unwinds the stock, prints one or more impressions on the impact polystyrene surface of the roll stock, and rewinds the roll stock. Typically, the printed roll stock is aged for less than about 24 hours to permit the ink to cure substantially prior to cup forming.

Figures 2A, 2B, 2C:
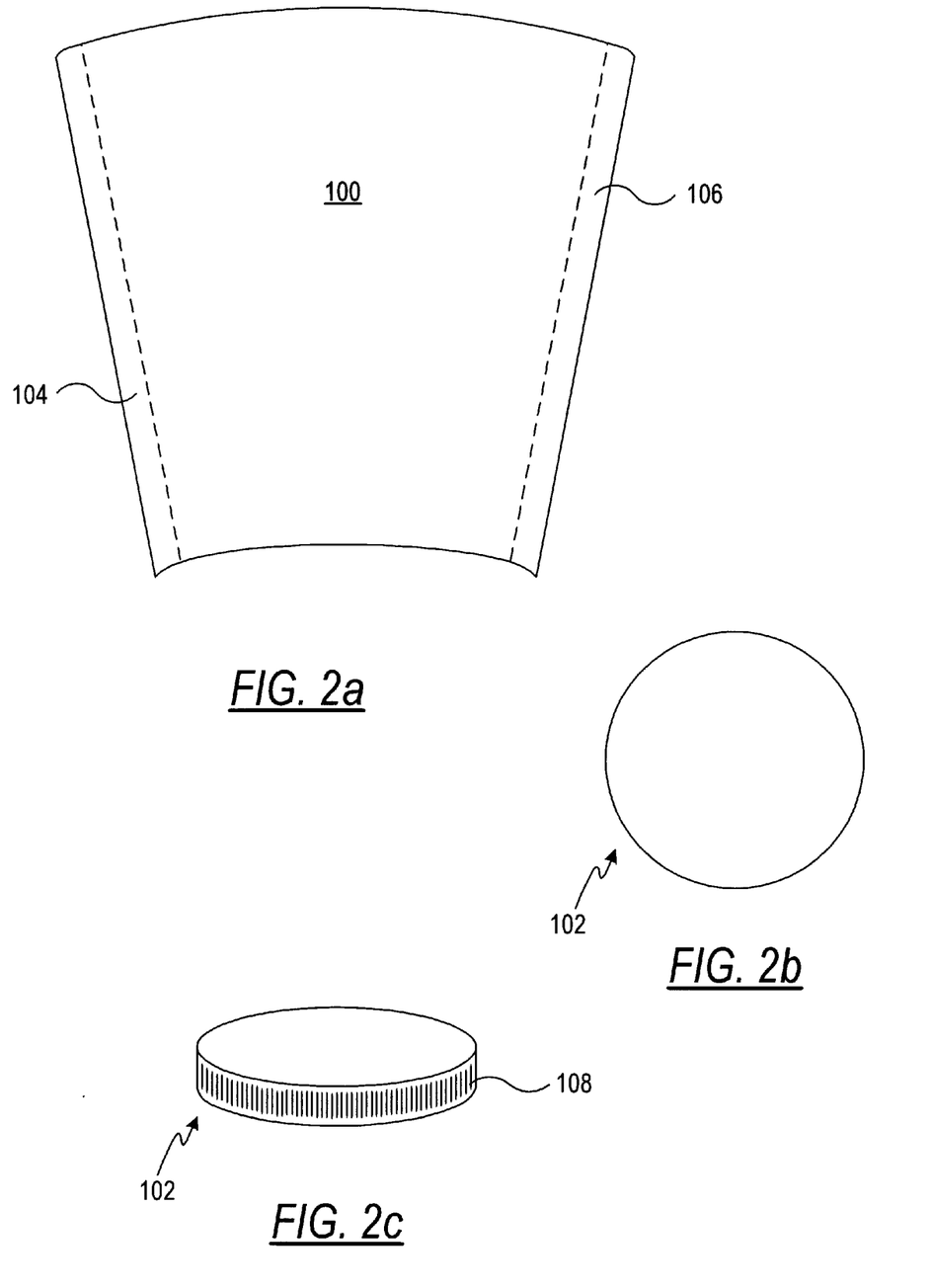
FIGS. 2–5 illustrate various steps in a foam cup production process.

Cups are formed from roll stock by processing the roll stock and cut portions thereof through a number of individual work stations within a cup forming machine 32. First, cup forming machine 32 employs separate blanking stations which are fitted with dies to cut the respective roll stocks into sidewall and bottom cup portions 100 and 102, respectively (see FIGS. 2a and 2b). Sidewall cup portions 100 are transferred to a side seam heating station (not shown) where heat is applied to opposite sides 104 and 106 of sidewall cup portion 100 where a sidewall seam will be formed. Simultaneously, bottom cup portions 102 are mechanically punched and drawn to form a skirt 108 to be used as a sealing surface for joining sidewall portions 100 and bottom up portions 102 (see FIG. 2c). Portions 102 are then heated at a bottom portion preheat station (not shown).

Figure 3:
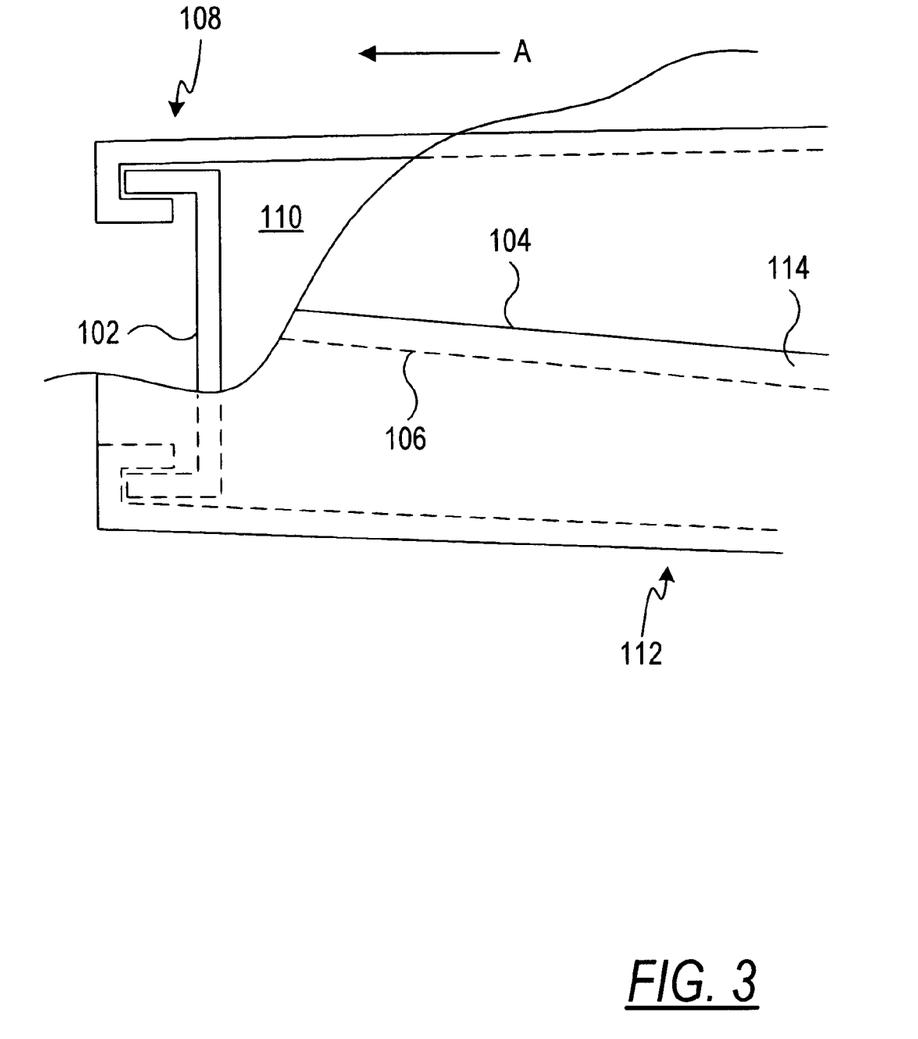

Preheated cup portions 100 and 102 are joined around a forming mandrel 110 as shown in FIG. 3, with heated sides 104 and 106 overlapping to form a cup shell 112 having a sidewall seam 114. Mandrel 110 then is indexed to a bottom heating station, skirt 108 of bottom portion 102 and the inner lower portion of shell 112 are heated, with portion 102 being pushed in the direction of arrow A toward the narrower end of shell 112.

Figure 4:
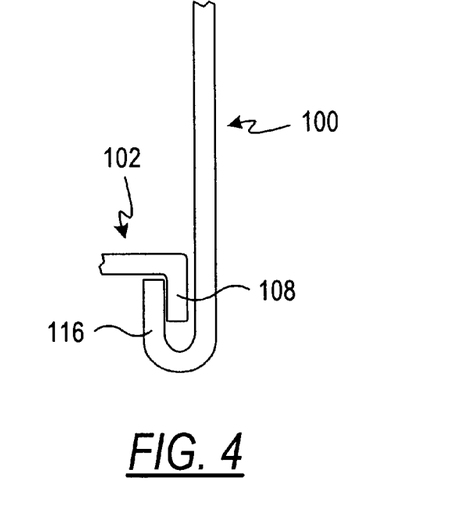
Figure 5A:
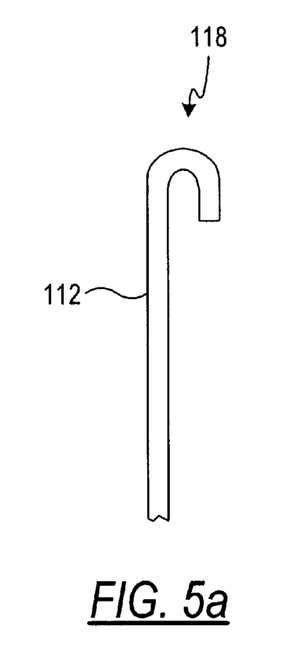
Figure 5B:
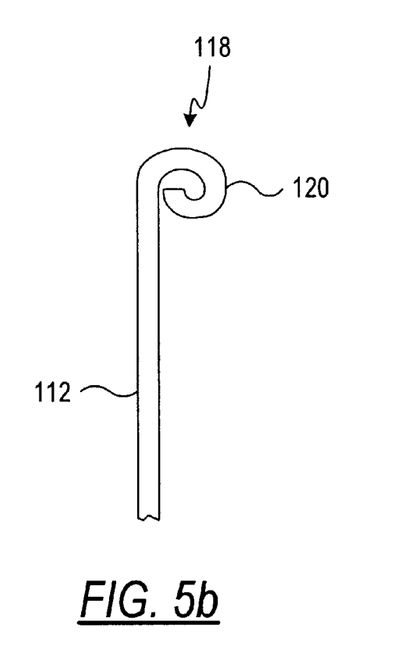

Heat-sealed sidewall and bottom portions 100 and 102 are then moved to a bottom incurl station where a lowermost portion 116 of the sidewall portion 100 is curled inwardly over skirt 108 as depicted in FIG. 4. Heat-sealed sidewall and bottom portions 100 and 102 are subsequently finished, knurled, sealed and squared at a bottom finish station (not shown). Next, an open edge 118 of cup shell 112 is mechanically precurled as shown in FIG. 5a, and then a rim 120 is formed by rolling the precurled end as shown in FIG. 5b. After the foregoing operations have been completed, the formed cups are heat treated to expand the foam, thereby imparting a wrinkle-free finish and additional strength to the cup.

The use of an adhesive-free heat-sealing process as discussed above is preferred, although adhesives may be used to join cup portions 100 and 102 if desired. Further detail concerning the use of heat sealing in the production of cups and the like is provided in U.S. Pat. Nos. 4,490,130 and 5,507,640, the disclosures which are incorporated herein by reference.

Static electricity most commonly is generated when two materials in contact with each another are subsequently separated. Thus, virtually every step in the above-described process has the potential for generating static charges in the stock material or cup parts or for transferring static charges from process equipment to the stock material or cup parts, such as when the stock material passes over or between equipment components such as idler rollers. These static charges often can cause a stack of finished cups to possess an electrostatic charge that renders the cup stack unreliable for use in automated vending applications.

Figure 6:
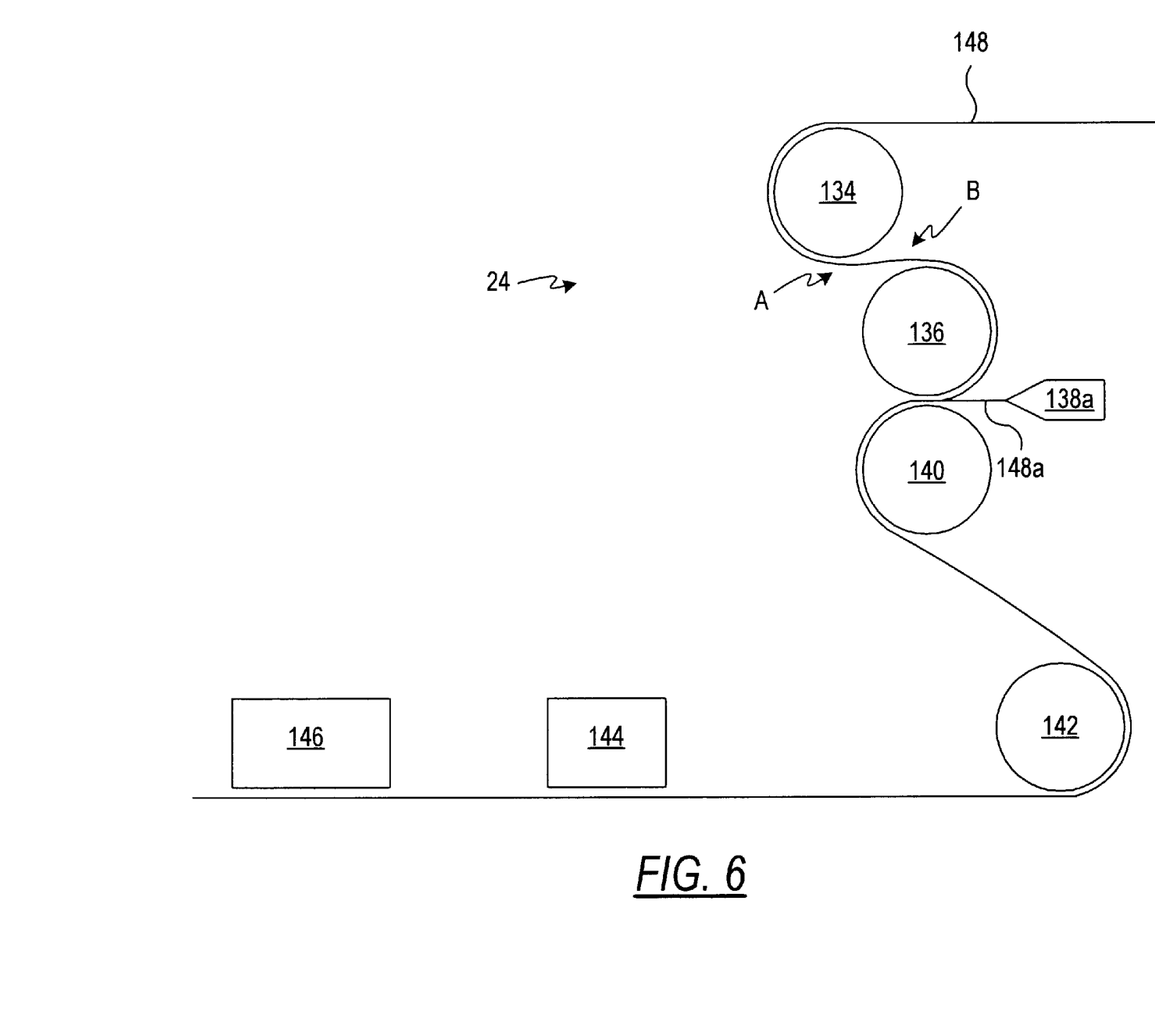
FIG. 6 is a simplified cross-sectional view of a polystyrene laminator depicting the placement of static elimination equipment useful for reducing static charges induced in a laminated foam stock during the lamination process.

FIG. 6 provides a simplified view of the laminating extruder 24 and assists in explaining how static charges are generated in the laminating step of the above-described cup production process. As depicted in FIG. 6, laminating extruder 24 includes as its principle components an idler roll 134, a first polish roll 136, a laminate extruder die 138, a second polish roll 140, a second idler roll 142 and static reduction devices 144 and 146. During operation of laminating extruder 24, a polystyrene foam web 148 of the type described in connection with FIG. 1 first passes over idler roll 134 and then over first polish roll 136 immediately prior to impact polystyrene 148a being extruded onto web 148 through die 138. The foam web 148 then passes between polish rolls 136 and 140 which compress the laminated web. The laminated web 148 next passes over idler roll 142 and through the fields of static reduction devices 144 and 146. Each time the web 148 contacts and then separates from an extruder component such as rolls 136, 140 or 142, a static charge can be induced which may remain with the web 148 throughout the web and cup production processes.

To mitigate the effects of static electricity, various types of static reduction equipment can be added to process equipment, such as extruder 24, once an equipment component has been identified as a source of static charge. For example, static reduction devices 144 and 146 were added to the laminating extruder 24 when it was discovered that the lamination process induced charges in the laminated stock that generally remained in the laminated stock throughout the cup production process.

According to one embodiment of the present invention, static reduction device 144 employs a very thin film of radioactive, alpha particle emitting Polonium 210. The alpha particles emitted by the device 144 ionize the air between the web 148 and the device 144, thereby allowing static charges generated in the lamination process to dissipate through the ionized air to a grounded surface. While the device 144 can be effective at distances up to about three inches from web 148, it is preferred that device 144 be within about one inch of web 148 to maximize its effectiveness. To further reduce static present on laminated web 148, web 148 passes through the web bar static reduction device 146. Device 146 employs a several thousand volt alternating current source to ionize the air around web 148. Devices 146 and 148 typically reduce electrostatic potential as measured one inch above web 148 from about +/−10 to 15 kilovolts to about +/−1 to 2 kilovolts as the web 148 leaves the device 146.

Good engineering practice suggests that all significant sources of static electricity in foam product production equipment such as extruder 24 be identified and that static reduction equipment such as devices 146 and 148 be installed to reduce the induced static throughout the production process. For example, in some cases, it may be desirable to place additional static elimination equipment immediately before and after an idler roll such as idler roll 134 at locations A and B in FIG. 6 on opposite sides of the web to minimize the chance that a static charge may become trapped within web 148 by the phenomena typically known to those skilled in the art as Maxwell-Wagner polarization.

In this regard, it should be noted that while laminate layers applied to foam substrates at temperatures above the laminate's glass transition temperature typically do not accumulate or contribute to static charges, the laminate layer can entrap a static charge already present on the foamed layer.

Additional techniques may be employed wherever possible, such as the use of corona treatment in the printing process. Corona treatment employs relatively high voltages to roughen the web surface prior to printing. The improved surface provides greater adhesion of topical agents and is believed to provide an effective means to alter and randomize accumulated charges on the cup stock, thereby potentially minimizing the effect of the charges.

Unfortunately, experience has shown that while the static reduction techniques described above are necessary to produce foamed articles which are relatively free from the effects of static electricity, application of those techniques alone is insufficient to produce nested stacks of reliably vendible foam cups. Foam cup stacks produced on foam production lines incorporating the static reduction techniques discussed above at times often exhibit a high electrostatic potential. Cups from stacks exhibiting high electrostatic potential will not reliably separate from the stack when used in automatic vending applications. Generally, a stack of 50 or more foam cups has been found to vend successfully when the electrostatic potential measured at one inch from the cup stack was less than about +/−7.5 kilovolts and the potential measured at one inch from all surfaces of a cup separated from the stack was less than about +/−5 kilovolts.

EXAMPLES

In an effort to reduce static levels on thermoformed foam cups, several experiments were performed in which commercially available antistatic agents were either topically applied to the cup exterior surfaces or extruded into the foam or solid polystyrene layers of the laminated layer of the cup stock. These experiments are summarized in the following Examples. The foam stock used in all of the following Examples to prepare cups was a solid polystyrene/polystyrene foam roll stock prepared as described above. Formed cups were conditioned as described below and their vendibility tested by dispensing the cups in either an Automatic Vending Products International, Ltd. Model 213 20 beverage vending machine, or in a Crane National Vendors Model 625D beverage vending machine. The results of these tests are summarized as Examples 1–26 in Tables 1, 2 and 3. These Examples demonstrated the ability of antistatic coatings in accordance with the present invention to dissipate and relax electrostatic potential induced in the cup or cup stock by the cup manufacturing process.

Examples 1–13

Referring to Table 1, Example 1 is representative of a cup manufactured in accordance with the above described process, but without the use of an antistatic chemical. The cups in Example 1 were stored at a temperature of about 18° C. and 15% relative humidity for 10 days prior to testing in a commercial vending machine. Immediately prior to testing, five stacks of 72 cups (360 total cups) were removed from the storage chamber and loaded into a vending machine. Cup stack potentials were measured before placing the cup stacks in the vending machine using a SIMCO HAND-E-STAT portable field strength meter held one inch from the cup stack surface. The field strength meter was swept along the length of the cup stack to determine the maximum positive and negative potential values reported herein. The ambient environmental condition during the testing was 19° C. and 48% relative humidity. The time required for each cup vend was measured for determination of a "good vend" or a "failed vend". A "good vend" occurred when a cup arrived at the cup fill station in 5 seconds or less after being dispensed from the cup stack by the dispenser ring, and a "failed vend" occurred when a cup took longer than 5 seconds to arrive at the cup fill station or never arrived at the fill station.

As shown in Table 1, Comparative Example 1 had a failed vend 2 of the 360 cups. While this failure rate may appear to be relatively low, the minimally acceptable vending failure rate of 1 in 1000. The results are not surprising since the cup stacks exhibited cup stack potentials ranging from −4.8 to +8.2 kilovolts.

Inventive Examples 2–6 demonstrate the effectiveness of cups produced in accordance with the present invention. Each cup in Inventive Examples 2–6 was formed from cup stock that was overprinted with about a one micron thick layer of a solution comprised of 12 wt. % of the commercially available antistatic agent HOSTASTAT HS-1, 20 wt. % of #7210 mixing white ink available from Lewis O. Werneke Co., of Plymouth Minn., and 68 wt. % deionized water. (referred to in Table 1 as "12% HS-1"). HS-1 is an anionic surfactant antistatic agent available as a water soluble powder from Hoechst Celanese Corporation of Charlotte, N.C., and is a mixture of sodium alkyl sulfonates having the formula $C_{10-18}H_{21-39}SO_3Na$. Inventive Examples 3 and 6 included an additional 4 wt. % of HS-1 extruded into the impact polystyrene outer cup stock layer to determine if the presence of extruded antistatic agent improved vending performance. The storage and test procedures for Inventive Examples 2–6 mirrored those of Comparative Example 1, with the specific storage, test and vending conditions indicated in Table 1.

Unlike Comparative Example 1, every cup tested in Inventive Examples 2–6 resulted in a good vend. In addition, the printed image on each cup in Inventive Examples 2–6 was sufficiently durable in that no scuffing of the cups appeared from the cup forming, stacking or subsequent handling. Furthermore, the measured cupstack potentials were substantially lower than in Comparative Example 1, with no measured potential exceeding +/−4 kilovolts, thereby verifying the correlation between good vends and low cup stack electrostatic potential. The presence of extruded antistatic agent in the foam layer of the stock in Inventive Examples 3 and 6 did not appear to produce superior vending performance since all of the cups vended successfully. This was surprising since the manufacturer recommended extruding HS-1 into a polymer foam. Lastly, the cups with the antistatic coating in Inventive Examples 2–6 did not have detectable odors or taste altering effects when qualitatively tested.

Comparative Examples 7–13 did not use an alkyl salt surfactant as an antistatic agent (like in Examples 2–6). However, Examples 7–10 and 13 used the same mixing white ink as used in Examples 2–6. The storage and test procedures for Examples 7–13 mirrored those of Example 1, with the specific storage, test and vending conditions and vending test results indicated in Table 1.

Specifically, Examples 7 and 8 comprised a printed overcoat consisting of 6 wt. % of polyvinyl alcohol, 20 wt. % of mixing white ink, and 74 wt. % of deionized water. (referred to as "PVA" in Table 1). Examples 9 and 10 comprised a printed overcoat of 10 wt. % polyvinyl pyrrolidone, 20 wt. % of mixing white ink, and 70 wt. % of deionized water. (referred to as "PVP" in Table 1). Examples 11 and 12 comprised a printed overcoat of 100 wt. % of Adcote 61X102 transparent coating available from Morton International of Chicago, Ill. (referred to as "Morton" in Table 1). Finally, Example 13 comprised a printed overcoat of 67 wt. % of the #7210 mixing white ink and 33 wt. % of the proprietary polyether antistatic ink FDA-3 marketed by Amstat Industries, Inc. of Glenview, Ill. (referred to as "FDA-3" in Table 1).

The results showed that Comprative Examples 7–13 had much lower vending rates and much higher cupstack electronic potentials as compared to Inventive Examples 2–6. Thus, the topically applied alkyl salt/mixing white ink antistatic coating (Examples 2–6) had much better results than using commercially available antistatic agents with the mixing white ink (Examples 7–10 and 13) or using only a commercially available antistatic agent ink (Examples 11 and 12).

TABLE 1A

| | Antistatic Agent Extruded Into Foam Layer (wt. %) | Antistatic Agent Extruded Into Foam Layer (wt. %) | Antistatic Agent Topically Applied to Laminate Layer | Cup Storage Conditions | | |
|---|---|---|---|---|---|---|
| | | | | Temperature (° C.) | Relative Humidity (%) | Cup Stack Potential (kV) |
| Example 1 | 0 | 0 | None | 18 | 15 | −4.8 to +8.3 |
| Example 2 | 0 | 0 | 12% HS-1 | 18 | 15 | −2.1 to +3.4 |
| Example 3 | 0 | 4 | 12% HS-1 | 18 | 15 | −2.0 to +3.1 |
| Example 4 | 0 | 0 | 12% HS-1 | 18 | 15 | +3.8 to −0.6 |
| Example 5 | 0 | 0 | 12% HS-1 | 66 | 1 | −0.8 to +1.1 |
| Example 6 | 0 | 4 | 12% HS-1 | 66 | 1 | +1.8 to −1.2 |
| Example 7 | 0 | 0 | PVA | 18 | 15 | +18 to => 20 |
| Example 8 | 0 | 0 | PVA | 18 | 15 | >±20 |
| Example 9 | 0 | 0 | PVP | 18 | 15 | +17.7 to −16.1 |
| Example 10 | 0 | 0 | PVP | 18 | 15 | >±20 |
| Example 11 | 0 | 0 | Morton | 18 | 15 | +15.8 to −14.8 |
| Example 12 | 0 | 0 | Morton | 18 | 15 | +18 to > −20 |
| Example 13 | 0 | 0 | FDA-3 | 18 | 15 | >±20a |

TABLE 1B

Vending Test Conditions and Results

|  | Temperature (° C.) | Relative Humidity (%) | Total Cups | Good Vends | Failed Vends | Print Durability |
|---|---|---|---|---|---|---|
| Example 1 | 19 | 48 | 360 | 358 | 2 | Good |
| Example 2 | 19 | 48 | 500 | 500 | 0 | Good |
| Example 3 | 19 | 48 | 250 | 250 | 0 | Good |
| Example 4 | 18 | 4 to 15 | 200 | 200 | 0 | Good |
| Example 5 | 22 | 58 | 200 | 200 | 0 | Good |

TABLE 1B-continued

Vending Test Conditions and Results

|  | Temperature (° C.) | Relative Humidity (%) | Total Cups | Good Vends | Failed Vends | Print Durability |
|---|---|---|---|---|---|---|
| Example 6 | 22 | 58 | 200 | 200 | 0 | Good |
| Example 7 | 18 | 4 to 15 | 300 | 280 | 20 | Good |
| Example 8 | 19 | 48 | 100 | 26 | 74 | Good |
| Example 9 | 19 | 48 | 100 | 79 | 21 | Good |
| Example 10 | 18 | 4 to 15 | 150 | 139 | 11 | Good |
| Example 11 | 19 | 48 | 100 | 53 | 4 | Good |
| Example 12 | 18 | 4 to 15 | 300 | 26 | 274 | Good |
| Example 13 | 19 | 48 | 500 | 223 | 277 | Good |

Example 14–20

Examples 14–20 in Table 2 comprised different concentrations of an alkyl salt useable in a mixing white ink and deionized water mixture topically applied to cup stock. Specifically, Examples 14–16 comprised a one micron thick printed overcoat of an antistatic agent consisting of 23.5 wt. % of HS-1, 20 wt. % of mixing white ink, and 56.5 wt. % of deionized water. (referred to as "23.5% HS-1" in Table 2). Examples 17–20 comprised a one micron thick printed overcoat of an antistatic agent consisting of 7.5 wt. % of HS-1, 20 wt. % of mixing white ink, and 72.5 wt. % of deionized water. (referred to "7.5% HS-1" in Table 2).

Referring to Table 2, Examples 14–16 with the 23.5% HS-1 mixture resulted in no failed vends. However, the printed image on the cups in Examples 14–16 was not durable because the images on the finished cups were scuffed. The poor durability of the printed image is believed to result from the relatively high levels of HS-1 in the printed overcoat interacting with ink in images already printed on the cup. This interacting may occur because of the overcoat rewetted the printing image or the overcoat prevented the image from drying.

Examples 17–20 with the 7.5% HS-1 solution resulted in printed images that were durable. However, the vending performance of the cups in Examples 17–20 was unsatisfactory. This is clearly shown when all of the Examples 17–20 failed to satisfy the minimal standard of 1 vending failure per 1000 cups vended.

TABLE 2

|  | Antistatic Agent Extruded Into Foam Layer (wt. %) | Antistatic Agent Extruded Into Laminate Layer (wt. %) | Antistatic Agent Typically Applied to Laminate Layer | Corona Treatment | Vending Test Results | | | |
|---|---|---|---|---|---|---|---|---|
|  |  |  |  |  | Total Cups | Good Vends | Failed Vends | Print Durability |
| Example 14 | 0 | 2 | 23.5% HS-1 | Yes | 700 | 700 | 0 | Poor |
| Example 15 | 0 | 2 | 23.5% HS-1 | Yes | 700 | 700 | 0 | Poor |
| Example 16 | 0 | 2 | 23.5% HS-1 | Yes | 700 | 700 | 0 | Poor |
| Example 17 | 0 | 4 | 7% HS-1 | Yes | 450 | 447 | 3 | Good |
| Example 18 | 0 | 2 | 7% HS-1 | Yes | 450 | 334 | 116 | Good |
| Example 19 | 0 | 2 | 7% HS-1 | Yes | 450 | 419 | 31 | Good |
| Example 20 | 0 | 2 | 7% HS-1 | Yes | 450 | 444 | 6 | Good |

Examples 21–26

Cups prepared in accordance with Inventive Examples 2–6 provided outstanding print durability and vendibility under most manufacturing conditions. However, isolated production runs of cups produced in accordance with Inventive Examples 2–6 sporadically exhibited poor vendibility. These cups typically were not reliably vended when the relative humidity in the manufacturing facility was 30% or less, with more extreme vending difficulties occurring when the relative humidity was less than 20%.

Referring to Table 3, Examples 21–24 tested four batches of cups produced under extremely low humidity manufacturing conditions. Examples 21–24 all comprised 12 wt. % HS-1, but Examples 22 and 24 had corona treatment of the web immediately prior to printing and Examples 23 and 24 had additional antistatic agent incorporated into the polymeric material used to create the cup's outer laminate layer. The vending results in Table 3 indicated that neither the corona treatment and the additional antistatic agent incorporated in to the polymeric material had a significant effect on the failed vends. However, the corona treatment is still important because the ink more effectively adheres to the polymeric surface.

The cup stacks typically exhibited electrostatic potentials in excess of +/−7.5 kilovolts in Examples 21–24. Similarly high electrostatic potentials were present on the cup roll stock as the stock was unwound and fed to the cup forming machine. Examples 25 and 26 were performed to see of the topically applied antistatic mixture could further enhance its performance prior to cup forming. Because the antistatic agent was humidity-sensitive, the roll stock was conditioned in a relatively higher humidity environment so that the roll stock might better dissipate unwanted static before being exposed to charges generated by cup forming equipment.

Specifically, the printed rolls of cup stock in Examples 25 and 26 were treated with antistatic coatings of the present invention and placed in a storage area where the relative humidity was maintained at about 50%. The roll stock was preconditioned in the storage area for a period of 72 hours prior to cup forming. The cups were then manufactured from the preconditioned roll stock under the same adverse, low humidity conditions already noted. As shown in Table 3, all of the cups in Examples 25 and 26 resulted in good vends. The preconditioning of the roll stocks used under the extremely low humidity conditions reduced the electrostatic potential on cup stock fed to the cup forming machine to levels below +/−5 kilovolts.

While not wishing to be bound by the theory, it appears that humidity preconditioning a treated roll stock prior to cup forming increases the effectiveness of the antistatic overcoat so that the overcoat can dissipate static charges induced in the cup stock, cups or cup stacks in the cup manufacturing process. While it was also noted that it was possible to exploit the effects of topically applied antistatic mixtures in accordance with the present invention by humidity conditioning foamed articles after the forming step, such conditioning is relatively inefficient when compared to preconditioning roll stock and in some instances proved ineffective in dissipating static charges accumulated during the forming process.

graphic image prior to the roll stock being rewound and transferred to a cup forming machine.

Figure 7:
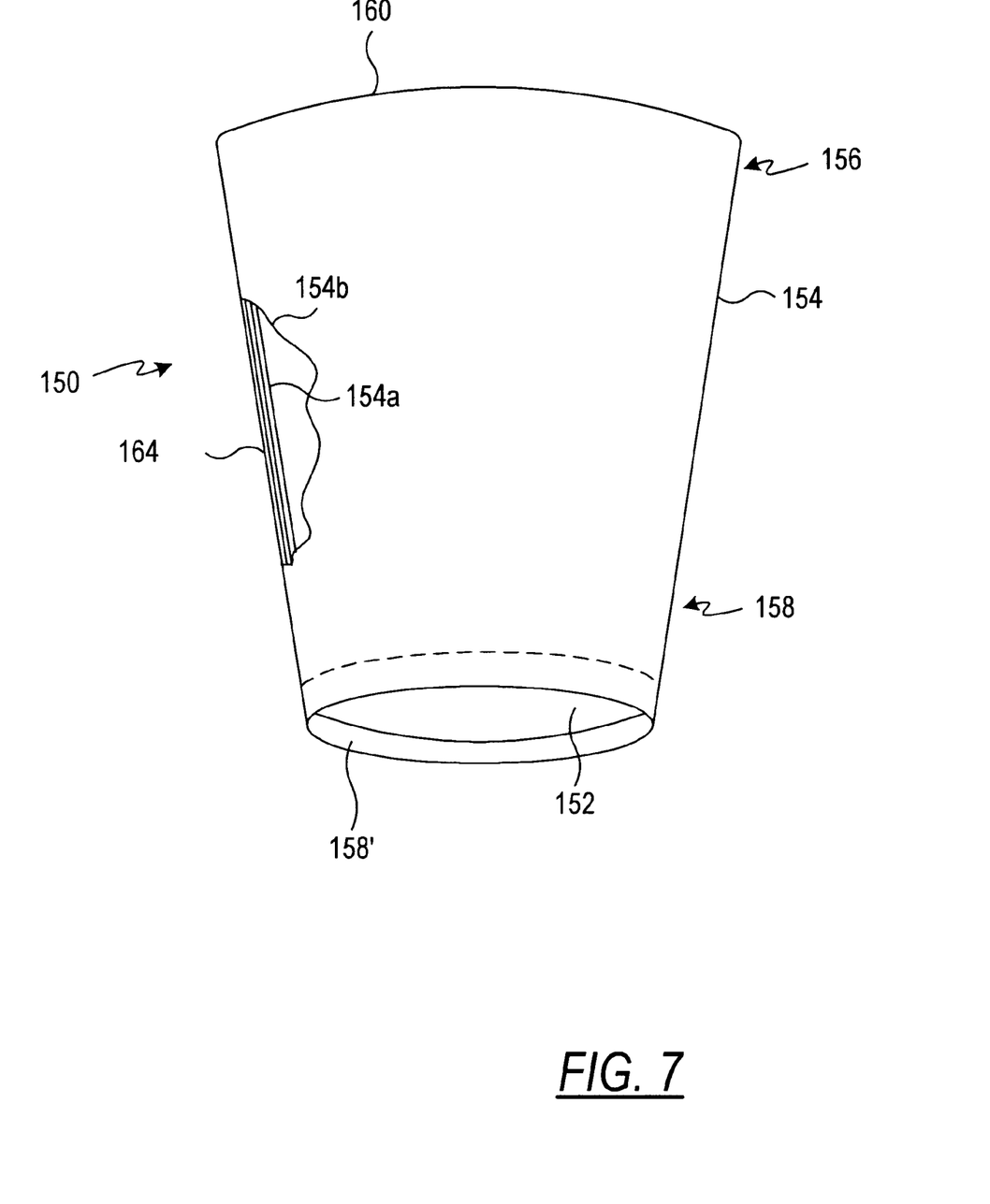
FIG. 7 is a cutaway perspective view of a vendible foam cup in accordance with the invention.

Typically, chemical coating 164 will cover all outer surfaces of cup 150. However, it is believed that the advantages of the invention can be realized if at least 75 percent of the outer sidewall of cup 150 is overprinted with the chemical coating. Less than complete coating of an article's surface area may limit the ability of the web or the article to dissipate accumulated static charge. Therefore, it is desired to cover all the outer surfaces of the cup 150.

The first process is typically for low relative humidity manufacturing environments. This process generally includes the steps of topically applying a mixture comprising a humidity-sensitive antistatic surfactant compound to a foam stock from which the article is to be formed, conditioning the foam stock in a humidity-controlled environment effective to reduce electrostatic potential of the stock to between −5 and +5 kilovolts, and thereafter, thermoforming the article from the conditioned foam stock. As discussed earlier, this process maximally exploits the antistatic effects of the topically applied antistatic agent during the manufacturing process by using humidity to condition a foam stock just before the stock is processed in a thermoforming apparatus. The conditioning renders the topically applied

TABLE 3

| | Antistatic Agent Extruded Into Foam Layer (wt. %) | Antistatic Agent Extruded Into Laminate Layer (wt. %) | Antistatic Coating | Corona Treatment | Vending Test Results | | |
|---|---|---|---|---|---|---|---|
| | | | | | Total Cups | Good Vends | Failed Vends |
| Example 21 | 0 | 0 | 12% HS-1 | No | 250 | 236 | 14 |
| Example 22 | 0 | 0 | 12% HS-1 | Yes | 250 | 230 | 20 |
| Example 23 | 0 | 4 | 12% HS-1 | No | 250 | 219 | 31 |
| Example 24 | 0 | 4 | 12% HS-1 | Yes | 250 | 232 | 18 |
| Example 25 | 0 | 0 | 12% HS-1 | Yes | 400 | 400 | 0 |
| Example 26 | 0 | 0 | 12% HS-1 | Yes | 400 | 400 | 0 |

A finished cup 150 representative of the cups used in the above Examples is shown in more detail in FIG. 7. The cup 150 includes a generally circular bottom 152 which typically is cut and formed from the same foam stock as cup frustoconical sidewall 154. The sidewall 154 typically has a truncated frustoconical shape as shown in FIG. 7 to facilitate cup nesting. The sidewall 154 includes a generally circular, upper open end portion 156 and a lower base portion 158, and is formed from the foamed polystyrene/solid polystyrene laminate described above. The sidewall 154 has a foamed polystyrene inner sidewall surface 154*a* and a solid polystyrene outer surface 154*b*. Bottom 152 is circumferentially attached at or near the lower base portion 158 by any of a number of attachment means known in the art, such as gluing or heat expansion of the bottom-sidewall interface. Typically, cup bottom 152 is fastened to lower base portion 158 slightly above the bottom edge of lower base portion 158 to prevent bottom nesting of stacked cups and to allow a section 158' of lower base portion 158 to be folded upwardly and inwardly to provide additional support for bottom 152 as already discussed herein. To assist in reinforcing, sidewall 154 includes a rim 160 around the upper periphery thereof.

In most cases, outer surface 154*b* of the cup 150 will bear a printed image (not shown) which has been printed on uncut cup roll stock by a flexographic printing process. Chemical coating 164 containing antistatic agent and a transparent or translucent water-soluble ink is printed over the desired antistatic mixture highly effective for dissipating static charges that otherwise would readily accumulate during the cup production and handling processes under the low relative humidity conditions. This result is not possible when using only an extruded antistatic agent that "blooms" to the surface over the life of the cup because the concentration of antistatic agent available to be effected by the humidification step during cup manufacture is insufficient to effectively dissipate static electricity generated in the cup's production and handling process.

A second process in accordance with the present invention is better suited to manufacturing under conditions where the relative humidity typically exceeds 30%. This process eliminates the need for a humidity conditioning step and relies instead on ambient humidity to render the topically applied antistatic mixture effective during the manufacturing process.

Humidity sensitive antistatic surfactant compounds useful in either of the above-described processes are highly polar compounds that adhere to a surface of a foamed polymer stock and demonstrate an increased propensity for dissipating a static charge as ambient humidity is increased. Such highly polar compounds include cationic antistatic compounds such as quaternary ammonium salts of organic compounds having alkyl chains of from about 4 to about 20 carbon atoms in length; anionic antistatic compounds such alkyl sulfates, alkyl sulfonates and alkyl phosphates having alkyl chains of from about 4 to about 20 carbon atoms in length; and nonionic highly polar organic compounds such as polyvinyl alcohol, polyvinylpyrrolidone and polyethers, as well as amines, acids and fatty acid esters. The amines, acids and fatty acid esters have alkyl groups of from about 4 to about 20 carbon atoms in length.

The use of the anionic and cationic compounds is preferred, with the use of anionic compounds most preferred. The anionic compounds including alkyl sulfates, sulfonates and phosphates having alkyl chains of from about 4 to about 20 carbon atoms are believed to be the most preferred compounds, with a mixture of sodium alkyl sulfonates having the formula $C_{10-18}H_{21-39}SO_3Na$ being particularly effective as demonstrated by the foregoing Examples. The data from Table 2 suggested that the amount of an ionic surfactant used in the printed overcoat should be from about 7.5 wt. % to about 23.5 wt. %. The preferred amount of ionic surfactant in the applied mixture should be from about 10 to about 15 wt. %.

It is contemplated that the foregoing compounds can be applied in any manner known in the art such as printing, dipping, spraying and the like. However, the durability of graphic images and the antistatic compound is enhanced by preparing an aqueous solution of the antistatic mixture and a translucent or transparent ink (often referred to as a "mixing white ink") which is printed over a graphic image already printed onto the foam stock during a flexographic printing process. The overcoat thickness should be from about 0.5 to about 3 microns, since thinner layers may not impart sufficient antistatic agent to be effective, while thicker layers may interfere with drying of the underlying image or soften an already dry image. The overcoat thickness is preferably about 1 micron.

While most water soluble inks are suitable for use in this application, some inks perform better than others, and should be empirically evaluated with the selected antistatic agent or agents. For example, in some instances, the Werneke #7210 mixing white ink and the MW1 mixing white ink available from Mead Ink Products of Anniston, Ala., provided superior print durability and vending results when compared to other similar inks used with the HS-1 antistatic agent. The preferred amount of mixing white ink in the overcoat mixture ranges from about 10 to about 30 percent, and preferably from about 15 to about 25 percent.

Foam stocks useful in the present invention can be any sheet or roll stock material suitable for forming which has at least one foamed polymeric layer. Examples of preferred sheet stocks include sheets of a single foamed polymer such as polystyrene as well as multi-layered laminated stocks incorporating a foamed polymer layer and a non-foamed polymer layer such as a solid polymer or other material such as paper or cardboard. A most preferred stock for forming cups intended for vending machine use is a roll stock that has an inner foamed polystyrene layer and an outer impact polystyrene layer.

The foregoing applications and Examples are merely representative of processes and articles in accordance with the present invention. Those skilled in the art will readily recognize other applications for the invention. While the invention has been disclosed in connection with a web-fed flexographic foam cup process, the invention can be used with other processes such as blank-fed machines, pneumatic part transfer or film production processes. Other potential applications include the manufacture of containers suitable for packaging static-sensitive electronic devices or other products where the presence of static electricity can damage the product or cause dust or other fine particles to undesirably accumulate in or on the package or packaged product. Alternatively, processes and articles in accordance with the invention may be used in any application where the reliable separation of stacked polymeric articles is required. The invention, therefore is not limited to the foregoing Examples, but only by the scope of the following claims.

What is claimed is:

1. An article comprising a foamed polymeric material bearing a coating, said coating comprising a residual layer formed by applying and allowing to dry a mixture, said mixture before being applied comprising from about 7.5 to about 23.5 weight percent of a humidity sensitive antistatic surfactant agent and from about 10 to about 30 weight percent of a water soluble ink, said article further having an electrostatic potential of from about −5 to about +5 kilovolts as measured at one inch from said coating.

2. The article of claim 1 wherein said coating is from about 0.5 to about 3.0 microns thick.

3. The article of claim 1 wherein said article has an outer surface, and wherein said coating covers at least 75 percent of said outer surface.

4. The article of claim 1 wherein the article is a cup comprising a generally circular bottom and a truncated frustoconical cup sidewall, said sidewall comprising a foamed polymeric material and having inner and outer surfaces, said inner surface and said circular bottom circumferentially cooperate to form a liquid tight seal between the bottom and the sidewall, and wherein the coated surface covers at least about 75 percent of said sidewall outer surface of the cup.

5. The cup of claim 4 wherein said sidewall comprises an inner layer of foamed polystyrene and an outer layer of solid polystyrene, and wherein said coating resides on said outer solid polystyrene sidewall surface and is from about 0.5 to about 3.0 microns thick.

6. The cup of claim 5 wherein said outer polystyrene sidewall surface bears a printed image, wherein said coating has been applied over said printed image, and wherein said printed image is visible through the residual layer.

7. The cup of claim 6 wherein said humidity sensitive antistatic surfactant agent is an anionic humidity sensitive surfactant agent and wherein said water soluble ink is a mixing white ink.

8. The cup of claim 7 wherein said anionic humidity sensitive surfactant agent is chosen from the group consisting of alkyl sulfates, alkyl sulfonates, and slkyl phosphates, said surfactant agent containing alkyl chains of from about 4 to about 20 carbon atoms in length.

9. The cup of claim 8 wherein said anionic humidity surfactant agent comprises a mixture of sodium alkyl sulfonates cosisting essentially of sulfonates having the molecular formulas $C_{10-18}H_{21-39}SO_3Na$.

10. The article of claim 1 wherein said humidity sensitive antistatic surfactant agent is an anionic humidity sensitive surfactant agent and wherein said water soluble ink is a mixing white ink.

11. The article of claim 10 wherein said anionic humidity sensitive surfactant agent is an alkyl sulfate, or an alkyl phosphate, said alkyl surfactant agent containing alkyl chains of from about 4 to about 20 carbon atoms in length.

12. The article of claim 11 wherein said anionic humidity sensitive surfactant agent comprises a mixture of sodium alkyl sulfonates consisting essentially of sulfonates having the molecular formulas $C_{10-18}H_{21-39}SO_3Na$.

13. The article of claim 1 wherein said mixture before being applied comprises from about 12 to about 23.5 weight percent of said humidity sensitive antistatic surfactant agent.

14. The article of claim 1, wherein said humidity sensitive antistatic surfactant agent is an alkyl sulfate, alkyl sulfonate, or an alkyl phosphate, said alkyl surfactant agent containing alkyl chins of from about 4 to about 20 carbon atoms in length, and wherein said mixture before being applied comprises from about 12 to about 23.5 wt. % of said alkyl surfactant agent.

15. The article of claim 1, wherein said humidity sensitive antistatic surfactant agent in a mixture of sodium alkyl sulfonates consisting essentially of sulfonates having the molecular formulas $C_{10\text{-}18}H_{21\text{-}39}SO_3Na$, and wherein said mixture before being applied comprises from about 12 to about 23.5 wt. % of said mixture of sodium alkyl sulfonates.

16. The article of claim 1, wherein said humidity sensitive antistatic surfactant agent is an anionic humidity sensitive surfactant agent, and wherein said mixture before being applied comprises from about 12 of about 23.5 wt. % of said anionic humidity sensitive surfactant agent.

17. An article comprising a foamed polymeric material bearing a coating, said coating comprising a residual layer formed by applying and allowing to dry a mixture, said mixture before being applied comprising from about 12 to about 23.5 weight percent of a humidity sensitive antistatic surfactant agent and from about 10 to about 30 weight percent of a water soluble ink, said article further having an electrostatic potential of from about −5 to about +5 kilovolts as measured at one inch from said coating.

18. The article of claim 17 wherein said coating is from about 0.5 to about 3.0 microns thick.

19. The article of claim 17 wherein the article is a cup comprising a generally circular bottom and a truncated frustoconical cup sidewall, said sidewall comprising a foamed polymeric material and having inner and outer surfaces, said inner surface and said circular bottom circumferentially cooperate to form a liquid tight seal between the bottom and the sidewall.

20. The article of claim 19 wherein the coated surface covers at least about 75 percent of said sidewall outer surface of the cup.

21. The article of claim 17 wherein the article is a cup comprising a generally circular bottom and a truncated frustoconical cup sidewall, said sidewall comprising a foamed polymeric material and having inner and outer surfaces, said inner surface and said circular bottom circumferentially cooperate to form a liquid tight seal between the bottom and the sidewall, said sidewall comprises an inner layer of foamed polystyrene and an outer layer of solid polystyrene, and wherein said coating resides on said outer solid polystyrene sidewall surface and is from about 0.5 to about 3.0 microns thick.

* * * * *